UNITED STATES PATENT OFFICE.

ERIK LUDVIG RINMAN, OF GOTTENBORG, SWEDEN.

PROCESS OF MANUFACTURING ALUMINUM COMPOUNDS.

No. 914,187.     Specification of Letters Patent.     Patented March 2, 1909.

Application filed August 7, 1906. Serial No. 329,633.

*To all whom it may concern:*

Be it known that I, ERIK LUDVIG RINMAN, a subject of the King of Sweden, residing at No. 27ᴬ Sveagatan, Gottenborg, Sweden, have invented a certain new and useful Process of Manufacturing Aluminum Compounds, of which the following is a specification.

In producing aluminum compounds from clays, the latter have hitherto been treated either with mineral acids (in particular, sulfuric acid) or with alkali-bisulfate. All these processes had, however, the fault that they do not produce preparations free from silicic acid, and do not give a good yield except at a high cost. This process was improved, from a theoretical standpoint, in 1893 by J. Heibling (German Patent No. 70549 and the U. S. Patent No. 521712) who describes, not only a process for the production of potash-alum from clays by the alkali-bisulfate method, but, further, a method for the production of hydrate of alumina from potash-alum, which is cheaper than the methods before described. The Heibling process consists, briefly, in heating, to 300° C., a paste of clay of sulfate ammonium and sulfate of potassium, mixed in proportion of one (1) molecule of alumina to three (3) molecules of sulfate of ammonium and one (1) molecule of sulfate of potassium, so that ammonia is given off and potash alum formed. As a result of such heating, the sulfate of ammonium decomposes into ammonia (which is volatilized), and into sulfuric acid which, combining with the sulfate of potassium, forms acid sulfate of potash. This latter compound then combines with the alumina of the clay, so that potash-alum is formed. Such potash-alum is then, after removing the iron by yellow prussiate of potash, treated with ammonia developed in the heating, so that hydrate of alumina is precipitated and a solution is recovered from the sulfate of ammonium and sulfate of potassium used. The Heibling process, therefore, differs, in theory, from the former alkali-bisulfate methods in that there are formed, in the same heating, acid sulfate of potash for the decomposition of clay, and also ammonia for the precipitation of the hydrate of alumina from the potash-alum. However, the Heibling method has the drawbacks of giving a poor yield, and the products are not sufficiently free from silicic acid. Owing to the slight solubility of the sulfate of potassium, washing out of the obtained hydrate of alumina is practicable only at great expense, and the removal of the iron is also too expensive, when the method is applied to ferruginous clays. For the recited reasons, the Heibling method has not met with practical application.

The present invention relates to a simple method, which is based on the discovery that alumina-containing materials, especially clays, can be decomposed directly by ammonium salts, and which new method does not possess the mentioned faults of the Heibling method aforesaid.

The new process, briefly stated, consists in intimately mixing finely-pulverized alumina-containing materials, such as, for instance, silicates of alumina, bauxite, kaolin, feldspar, and the like, with an ammonium salt, and then heating the mixture to nearly the temperature of dissociation or reaction of the ammonium salt. The ammonium salt is then decomposed, with separation of ammonia, and the acid of the ammonium salt, during its evolution, decomposes the alumina compounds in such a manner that the corresponding salt of alumina is formed, with separation of the silicic acid. The alumina-containing materials may be employed either in their crude state, or in refractory condition (chamotte). Of the ammonium salts, those of the mineral acids are particularly suitable. Ammonium sulfate, being the cheapest among ammonium salts, is specially suitable in practice. When use is made, for instance, of ammonium sulfate, the new process is carried out as follows: For example, finely-pulverized clays and finely-pulverized ammonium sulfate are very intimately mixed, and the mixture is introduced into suitable apparatus (preferably in the presence of super-heated steam) and there gradually heated, by any suitable source of heat, to about the temperature of reaction of the ammonium sulfate. Such reaction, indicated by the generation of ammonia, commences at about 270° C. In practice, the temperature is raised to about 400° C., as experience has shown that the reaction then gives better results. The following reaction takes place during the heating:

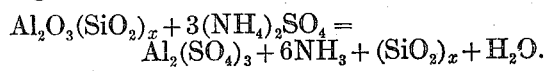
$$Al_2O_3(SiO_2)_x + 3(NH_4)_2SO_4 = Al_2(SO_4)_3 + 6NH_3 + (SiO_2)_x + H_2O.$$

As a matter of fact, however, the reaction does not proceed in this simple manner, but the aluminum sulfate forms at the moment of generating, with further ammonium sulfate, ammonium potash (a double salt), which is stable up to about 400° C., and is decomposed only at about or above this temperature so as to produce the ammonium sulfate which is stable up to a higher temperature. The formation of alum takes place as follows:

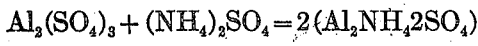
$$Al_2(SO_4)_3 + (NH_4)_2SO_4 = 2(AlNH_4 2SO_4)$$

As ammonium alum possesses the well-known property of crystallizing out free from iron from a ferrous solution, if the solution does not contain more ammonium sulfate than is requisite for the formation of $AlNH_4 2SO_4$, this circumstance may be utilized for producing alumina compounds free from iron from ferrous materials. For this purpose, the treatment is effected in such a manner that all the aluminum sulfate forms ammonium alum; theoretically it is necessary to employ for 102 parts by weight of alumina 528 parts by weight of ammonium sulfate. But, if the alumina-containing material contains, in addition to alumina, strong bases which also form sulfates, the quantity of ammonium sulfate to be employed must also be sufficient for covering these bases. In practice, the transformation is effected preferably by the following reaction:—

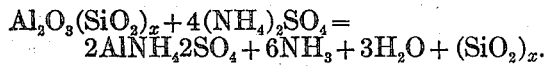
$$Al_2O_3(SiO_2)_x + 4(NH_4)_2SO_4 =$$
$$2AlNH_4 2SO_4 + 6NH_3 + 3H_2O + (SiO_2)_x.$$

The solid residue, containing the aluminum compound, according to circumstances either in the form of ammonium alum ($AlNH_4 2SO_4$) or in the form of aluminum sulfate ($Al_2(SO_4)_3$), is lixiviated with water. The ammonium alum (or the aluminum sulfate) is thereby dissolved, and the insoluble silicic acid and the chief quantity of iron remain behind, in the form of oxid, as a residue. From the solution, the ammonium alum (or the aluminum sulfate) is obtained, for instance, by crystallization. These salts may now be utilized directly as such. They may, however, also be converted into other aluminum compounds by processes known for this purpose. The ammonia, produced in the reaction, may be condensed in the customary manner. It is, however, expedient to transform the ammonia immediately into ammonium sulfate again by causing it to be absorbed by sulfuric acid. Use may, furthermore, be made of the solution of ammonium alum or aluminum sulfate, if necessary after crystallizing the compounds, for absorbing the ammonia. The ammonium sulfate thus obtained is then returned into the cycle.

In any treatment of ammonium alum to $Al_2O_3$ in the well-known manner by heating, the escaping mixture of ammonia, sulfuric acid and water may be condensed, together with the ammonia produced in the reaction, ammonium sulfate being formed again, so that a cycle will be obtained also in this case.

With a view to promoting the reaction and increasing yield of alumina, it is expedient to effect the heating of the mixture of clay and ammonium sulfate in the presence of superheated steam, because, as is well known, this vapor hydrates the clays and thus increases the solubility of the alumina. By this addition of steam, the temperature of reaction is moreover controlled, in case a variable source of heat is employed for heating the pulverized mixture. A further advantage lies in the fact that the ammonia is removed more easily, and the capability of reaction of the sulfuric acid in the nascent state, is increased.

In the case of other ammonium salts, the process is carried out in a similar manner. When, however, use is made for instance of ammonium chlorid, it is requisite, on account of the volatility of the same, to operate in closed vessels under pressure.

What I claim as my invention, and desire to secure by Letters Patent, is:

1. The herein-described process of producing aluminum compounds, consisting in directly heating a mixture of alumina-containing materials with ammonium salt, to the temperature of reaction of said ammonium salt, generating ammonia and forming the aluminum salt of the corresponding acid of the ammonium salt.

2. The herein-described process of producing aluminum compounds, consisting in directly heating a mixture of alumina-containing material with ammonium sulfate, to about 400° C., and generating aluminum sulfate and ammonia.

In testimony whereof I have signed my name to this specification in the presence of two subscribing witnesses.

ERIK LUDVIG RINMAN.

Witnesses:
THOS. CARLANDER,
CHRISTIAN ROLESS.